June 19, 1962  S. P. CLARK  3,039,825
DUAL WHEEL MOUNTING
Filed July 23, 1959
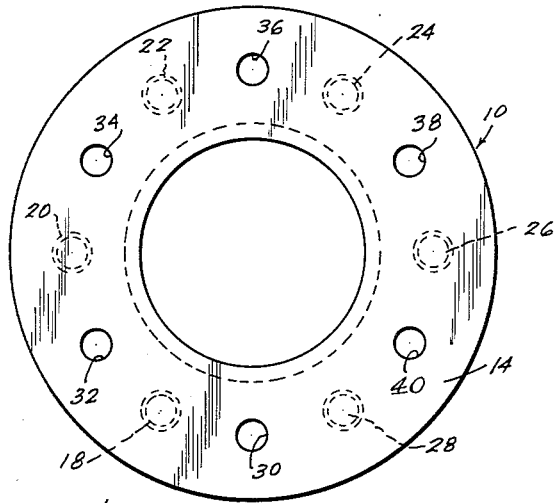
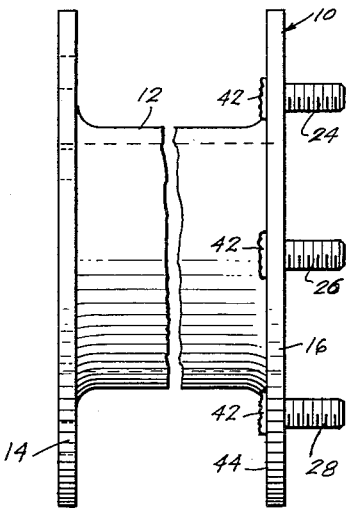
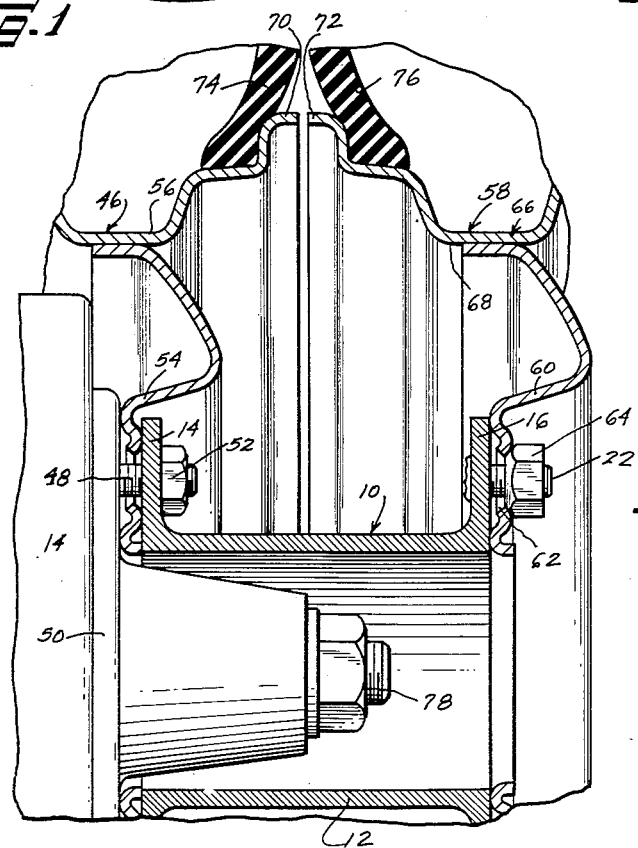
Inventor
Stevenson P. Clark

United States Patent Office 3,039,825
Patented June 19, 1962

3,039,825
DUAL WHEEL MOUNTING
Stevenson P. Clark, 3185 Royal Road, Coconut Grove, Miami, Fla.
Filed July 23, 1959, Ser. No. 829,135
2 Claims. (Cl. 301—36)

This invention relates to a connector for use with vehicle wheels and the like and more particularly to a unitary device for connecting an additional wheel to the wheel of an automotive vehicle.

Heretofore, various attempts have been made to provide a convenient means of connecting an extra wheel to a conventional automobile wheel so as to enhance the appearance and stability of the vehicle. Such attempts, however, have generally resulted in connection means characterized by a multiplicity of parts. Moreover, the previous constructions of which I am aware have required an extension of the axle of the vehicle or have entailed the use of separate rigidifying elements, and thus were highly complex and required a considerable amount of skill in assembly and disassembly.

The present invention overcomes these difficulties by means of a simple, unitary and rugged connector comprising a cylindrical wall and a radially extending annular flange on each end of the cylindrical wall. The flanges are of preferably equal radial dimensions and are disposed in parallel alignment for connection to a conventional vehicle wheel and an extra vehicle wheel, respectively, the cylindrical wall having a predetermined axial dimension such as to maintain the additional wheel in proximate relation to the vehicle wheel to which it is attached. The connector may be formed of cast steel or other suitably strong material and both the cylindrical wall or tube and the integrally formed annular flanges thereof have a thickness such as to resist all stresses which may be encountered in use.

In order to secure the connector to an automobile wheel or the like, one of the annular flanges thereof has a plurality of equi-angularly spaced apertures formed therearound for receiving in threaded engagement therethrough the lugs on the vehicle brake drum supporting the vehicle wheel. The other of the radial flanges carries a corresponding number of axially outwardly directed lugs similar to the lugs carried by the vehicle axle or drum, and which are desirably equally angularly spaced apart relative to one another and in angularly displaced relation to the apertures on the other flanges. In a preferred form of the invention the series of apertures and the series of lugs are offset angularly e.g. substantially 30°, so that stresses on the support structure of the invention will tend to cancel one another out. Also, assembly and disassembly of the device will be rendered somewhat easier due to the location of the inner ends of the lugs on the device in displaced relationship to the apertures and to bolts received through the said apertures.

Accordingly, it is an object of the present invention to provide a device for connecting an extra wheel to a conventional wheel of an automotive vehicle or the like, which is of a unitary, single-piece construction and which simplifies assembly and disassembly operations while affording a resistance to wear not available with devices utilizing a multiplicity of parts.

Another object of the invention is to provide a device as described having an annular flange on each end of a cylindrical wall structure, one of the flanges defining equally spaced apertures for connection with the lugs on a vehicle axle and the other of the flanges carrying equally spaced lugs for engagement in apertures formed in the hub of a second wheel to be connected to a wheel on the axle.

Another object of the invention is to provide a device as described which may be used without any special skills or training in the assembly or disassembly of a dual wheel construction for an automotive vehicle or the like.

Other objects and advantages of the invention will become apparent as the description proceeds in accordance with the drawings in which:

FIGURE 1 is a front elevational view of a wheel connector according to the invention;

FIGURE 2 is a side elevational view of the device shown in FIGURE 1; and

FIGURE 3 is a vertical sectional view of the device shown in FIGURES 1 and 2, partly broken away and in connected relation with a pair of vehicle wheels.

In the drawings:

Referring now to the drawings, a means for providing a dual wheel construction for an automotive vehicle or the like is shown comprising a unitary wheel connection member 10 having a cylindrical wall structure 12, a pair of integrally formed, radially extending and parallel annular flanges 14 and 16 at opposite ends thereof, and a plurality of axially outwardly extending, preferably equally angularly spaced threaded lugs 18, 20, 22, 24, 26 and 28 formed on one of the flanges 16.

A plurality of equally angularly spaced apertures 30, 32, 34, 36, 38 and 40 is formed in the opposite flange 14, as hereinafter further described. In a preferred form of the invention, the lugs 18 through 28 are offset angularly by approximately 30° relative to the location of the apertures 30 through 40, in the form shown where the lugs are spaced 60° apart and the apertures are spaced 60° apart, or, where a different number of lugs and apertures is utilized, the lugs and apertures may be similarly offset by an amount equivalent to half the angular spacing between them, which is, for example, 36° where five lugs and five apertures are provided. Thus fastening means are formed on each of the flanges such as to permit assembly and disassembly without interference from lugs on opposite flanges and also to cancel out stresses so that torque is distributed without undue concentration at specific points along the cylinder wall.

Desirably, the cylindrical wall 12 and the annular flanges 14 and 16 are cast as a single unit from a suitable material such as steel having a high degree of toughness and strength, and lathe finished. Lug holes for the lugs 18 through 28 as well as the holes 30 through 40 may be drilled after casting and the lugs 18 through 28 may be secured in position in the flange 16 by electric welding or other suitable means. Because of the angularly displaced relation of the bosses or protuberances such as indicated at 42 on the inner wall 44 of the flange 16 to the apertures 30 through 40, there will be no interference with fastening of lugs through the said apertures 30 through 40.

In assembling the connector 10 so as to mount an additional wheel on a car wheel 46 or the like (which may be any of the front or rear wheels) the device is rotated so that its apertures 30—40 will register with corresponding lugs such as indicated at 48, which are conventionally located on the brake drum 50. Thereupon the connector is moved axially so that the lugs 48 extend through the said apertures 30—40, and the nuts 52 for the lugs 48 are threaded into tight engagement with the flange 14. By this operation, the flange 14 is brought into snug engagement with the conventional spider disk wheel body 54, to which is welded tire rim 56. The rim 56 is shown as being of the multi-flange drop center type, but it will be understood that the connector of the invention may be utilized with a variety of wheel types and also, for example, with spare tires or in numerous other applications.

Thereupon a similar wheel 58 is secured in position on the flange 16 in essentially the same manner that wheel 46 is secured to the brake drum, so that no manipulation of unusual parts is required. Thus the spider disk wheel body 60 is rotated to register its apertures 62 with the lugs 18—28, and the wheel moved to pass the lugs through the apertures 62. The nuts 64 are then threaded into tight engagement with the wheel body, as would be done in mounting a wheel conventionally on a brake drum, so that the wheel body in turn is brought into snug abutting relationship with the flange 16.

It will be noted that the tire-rim 66, which is welded at its base flange 68 to the wheel body 60, is shown as being of a multi-flange drop center type also, and although other types of rims may be used with the connector of the invention, as stated, the axial dimension of the connector 10 is such as to dispose the terminal flanges of the rims, indicated at 70 and 72 in the example shown, in proximate relation and to place the tire bodies 74 and 76 in proximate or abutting relation. The tires 74 and 76 are of the tubeless type having sealing engagement with the rims 70 and 72, but again, these are shown for purposes of illustration only.

When the connector 10 is thus engaged on the wheel structure 46 and connected to the wheel structure 58, an exceptionally strong and reliable duo-wheel is provided. The interior of the connector is dimensioned to receive the terminal axle structure 78 freely therein and the length of the cylindrical wall 12 is sufficient to extend beyond the end of this axle structure as shown.

Because of the unitary construction of the connector, there is no chance that necessary parts will become lost or that parts will be improperly assembled. Further, because of the compact construction of the article, storage and shipment are simplified, and it will be seen for example, that a plurality of connectors may be stacked by inserting the lugs of one connector through the apertures of the next. And although the device is particularly suited for use with automotive vehicles, it can be employed in a wide variety of applications without requiring extensive modification. For example, it may be utilized for trucks, trailers, buses, vans, tractors, military vehicles and airborne vehicles, garden equipment, motor cycles, scooters, fork lifts, wagons, swamp buggies, underwater tractors and bicycles.

Although I have herein set forth and described my invention with respect to certain specific principles and details thereof, it will be understood by those skilled in the art that these may be varied without departing from the spirit and scope of the invention as set forth in the hereunto appended claims.

I claim as my invention:

1. For use with a first conventional vehicle wheel clamped between a brake drum and nuts threaded on angularly spaced brake drum lugs projecting from the drum around a terminal axle portion of the vehicle axle through holes in the wheel the improvement to form a dual wheel structure with a second conventional vehicle wheel which comprises a one-piece metal member having a cylindrical tubular central body with an inside diameter substantially larger than the terminal axle portion to freely encompass said portion in spaced relation therefrom, a first outturned radial flange on one end of the body, said first flange having a ring of angularly spaced holes registering with the brake drum lugs to receive the lugs therethrough and clamp the first flange between the first wheel and said nuts, a second outturned radial flange on the opposite end of said body, a ring of angularly disposed lugs projecting axially outward from said second flange in integral affixed relationship therewith to receive the holes of the second wheel, nuts threaded on the axially extending second flange carried lugs for clamping the second wheel between the second flange and the nuts on said lugs of the second flange, and said rings of flange lugs and holes having the same centers and radii with said lugs of the second flange being angularly displaced relative to the holes in the first flange to lie midway between the holes to facilitate assembly and disassembly and to distribute torque uniformly around the tubular body.

2. In combination with a conventional vehicle wheel assembly including a first vehicle wheel having a central axle-receiving aperture, a ring of lug-receiving holes around the aperture, a brake drum having a face for mounting the wheel, lugs projecting from the brake drum through the holes in the wheel and nuts on the lugs for clamping the wheel between the brake drum and the nuts, the improvement of a dual wheel mounting device for adding a second conventional wheel alongside of the first wheel in rigid fixed relation to the vehicle and to the first wheel which comprises a unitary metal member having a central cylindrical tubular body of substantially larger diameter than the projecting axle portion of the vehicle to freely encompass said portion out of engagement therewith, a first outturned radial flange on one end of said tubular body having a ring of holes registering with the brake drum lugs to receive the lugs therethrough for interposing the first flange between the first wheel and the nuts whereby the nuts clamp the first wheel and the member to the brake drum, said tubular body projecting beyond the axle portion of the vehicle, a second outturned flange on the opposite end of the tubular body and opposing said first flange, a ring of axially extending studs projecting outward from the second flange in fixed relationship therewith and positioned to register with the holes in the second conventional wheel, said ring of holes in the first flange and said ring of studs on the second flange having the same centers and radii, and nuts on said lugs of the second flange for clamping the second wheel between the second flange and the nuts to integrally affix the second wheel to the member.

References Cited in the file of this patent

UNITED STATES PATENTS

| | | |
|---|---|---|
| 1,297,243 | Putnam | Mar. 11, 1919 |
| 1,428,556 | Putnam | Sept. 12, 1922 |
| 2,067,620 | Johnston et al. | Jan. 12, 1937 |
| 2,570,559 | Juergenson | Oct. 9, 1951 |
| 2,635,012 | Rapport | Apr. 14, 1953 |